Nov. 20, 1923.

H. A. HOUSE, JR 1,474,632

WHEEL

Filed March 27, 1922

Inventor

HENRY A. HOUSE JR.

BY

Clarence S. Walker

HIS Attorney

Patented Nov. 20, 1923.

1,474,632

UNITED STATES PATENT OFFICE.

HENRY A. HOUSE, JR., OF BUFFALO, NEW YORK, ASSIGNOR TO WIRE WHEEL CORPORATION OF AMERICA, OF BUFFALO, NEW YORK, A CORPORATION OF NEW YORK.

WHEEL.

Application filed March 27, 1922. Serial No. 547,275.

*To all whom it may concern:*

Be it known that I, HENRY A. HOUSE, Jr., a citizen of the United States, and a resident of Buffalo, in the county of Erie and State of New York, have invented a certain new and useful Improvement in Wheels, of which the following is a specification.

This invention relates to an improvement in wheels and more particularly to disc wheels which are demountable at the hub and adapted for use upon motor vehicles.

One of the objections to the use of disc wheels has been the difficulty presented of raising or lowering the wheel when mounting it upon or dismounting from the hub. This difficulty is largely due to the fact that there are no projections upon a disc wheel so that it can be handled only by taking hold of the outside of the tire or rim, a hard and usually dirty operation due to the weight of the wheel.

The chief objects of this invention are to avoid the above-named difficulty by providing on the disc wheel a projection that can be grasped when raising or lowering the wheel which projection is securely attached to the wheel and covers the end of the axle, on which the wheel is mounted, thus protecting the wheel bearings from dust; to provide a wheel supported at the point of its greatest load upon the inner hub, and easily removable therefrom; and to provide a wheel having other details and improvements which will be set forth more fully below.

Other objects will appear from an examination of the following description taken in connection with the accompanying drawings which form a part thereof and in which—

Figure 3:
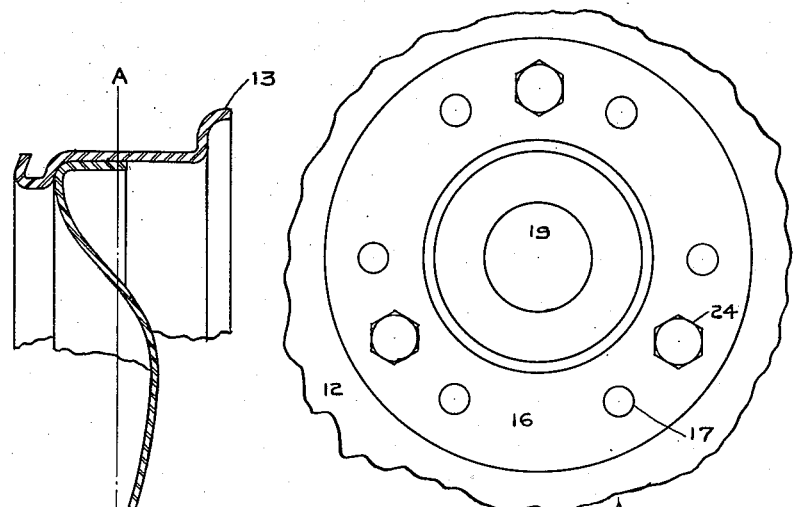
Fig. 3 is a front elevation of the hub of the wheel.

Referring to the drawings—the reference numeral 10 is used to designate the wheel proper and the numerals 11 and 11ᴬ, the hub on which the wheel is mounted. The wheel, 10 comprises a disc, 12, flanged at its periphery to receive the rim, 13, and provided with a central opening, 14, thru which the hub projects when the parts are assembled.

The disc, 12 is of uniform thickness and is provided adjacent the opening, 14, with a re-inforcing ring, 15, which is rigidly secured to the inner face of the disc. Rigidly secured to the outer face of the disc is a cupped member 16, which completely encloses the outer end of the hub.

Figure 1:
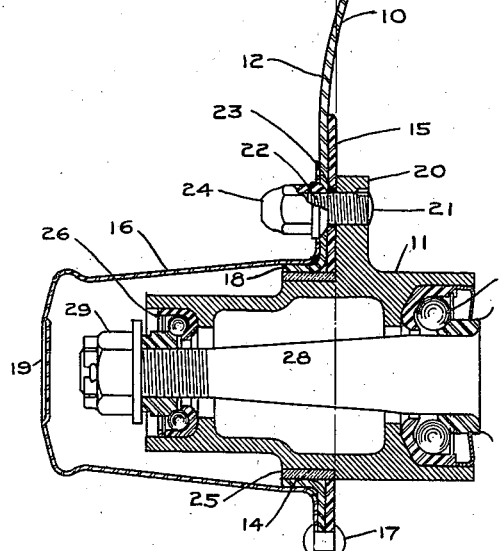
Fig. 1 is a transverse section of a disc wheel embodying this invention mounted upon a front axle.
Figure 2:
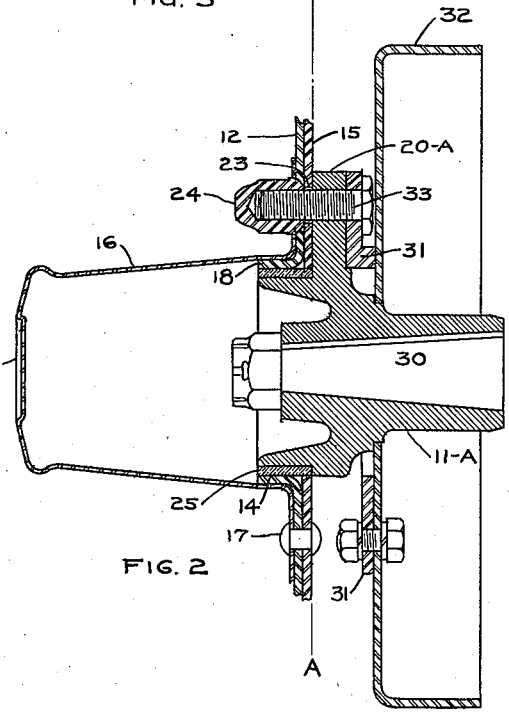
Fig. 2 is a similar view of the same embodiment mounted upon a rear axle.

As shown in Figures 1 and 2, the ring, 15 and member, 16 may be rigidly secured to the disc by rivets, 17, six of which are provided. The edge of the disc, 12 around the opening, 14, terminates in a flange, 18, turned outwardly to provide a supporting surface, on which the member, 16, which is also flanged, is supported. The rivets, 17 pass thru the flange of the member, 16 beyond the flange, 18. The closed outer end of the member, 16 is depressed as at 19 to receive a name plate or label, if desired.

Figure 4:
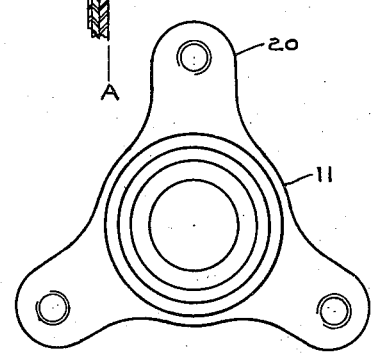
Fig. 4 is a front elevation of a front wheel hub.

The hub, 11, of Figs. 1 and 4, has a series of equally spaced integral arms, 20, at a uniform distance from the wheel center, in which are rigidly fixed studs, 21, each threaded at the outer end, 22. In the flange of the member, 16, the disc, 10 and the ring, 15, are provided similarly spaced holes, 23 thru which the studs, 21 project when the wheel is mounted on the hub. The outer edges of the holes, 23 are coned to receive the conical ends of the nuts, 24, which are threaded upon the studs, 21, and when properly seated in the holes, 23, draw the disc against the arms, 20 of the hub, 11, thus accurately centering it in position.

A ring, 25, is mounted upon the hub, 11, to receive the flanges, 18, and in order to avoid corrosion or freezing the ring is made of bronze or brass. The hub, 11 is carried by bearings, 26, 27, to rotate upon the axle spindle, 28, being held in position by the nut, 29.

In Figure 2, the disc wheel above described is shown assembled upon a rear axle, 30, the hub, 11ᴬ being keyed or otherwise suitably formed to rotate with the axle, 30. Mounted upon the inner face of the arms, 20ᴬ, similar in every respect to the arms, 20 of the hub, 11, is a ring, 31, which carries a brake drum, 32. In place of the studs, 21 bolts, 33 are provided by which the ring, 31 is fixed to the arms, 20ᴬ.

The member, 16, is so cupped that it completely encloses the inner hub and bearings, thus protecting them from dust and dirt, a particularly essential feature in the case of the front hub, the bearings, 26, being otherwise exposed. As hereinabove set forth, the member rests upon and is supported by the flange, 18 and is rigdly secured to the disc, 12. Furthermore, in order to function as a protecting cover for the hub and bearings, the member must project at a considerable distance from the disc so that it is adapted to function as a handle when mounting or dismounting the wheel thus obviating the necessity of taking hold of the tire or rim, which as pointed out above is one of the difficulties experienced in the use of disc wheels.

While one embodiment only of this invention has been shown and described, applicant is not to be limited thereby since it is obvious that other embodiments can be made without departing from the spirit and scope of this invention as set forth in the following claims.

Having thus set forth my invention, what I claim as new and upon which I desire protection is the following:

1. A disc wheel, demountable at the hub, comprising a disc having a central opening therethrough, a rim secured to the periphery of said disc, a reinforcing ring rigidly secured to the inner face of said disc around said opening and a cupped member rigidly secured to the outer face of said disc around said opening to close the same and to function as a handle during the mounting and dismounting of said wheel.

2. The combination with an axle spindle, bearings carried thereon and a hub supported on said bearings, of a disc wheel removably mounted on said hub, said wheel including a disc having a central opening thru which said hub extends, and a cupped member rigidly secured at its periphery to said disc around said opening, said member enclosing said hub, bearings and spindle to protect them from dust and being formed to function as a handle to facilitate the moving of said wheel.

In testimony whereof I affix my signature.

HENRY A. HOUSE, Jr.